United States Patent
Roberson, Jr. et al.

(10) Patent No.: US 7,044,520 B2
(45) Date of Patent: May 16, 2006

(54) VIBRATING SCOOP BASKET

(75) Inventors: Glenn A. Roberson, Jr., Hollister, CA (US); Glenn A. Roberson, III, Hollister, CA (US); Paul Domato, Hollister, CA (US)

(73) Assignee: Axiom International Group, LLC, Gardnerville, NV (US)

( * ) Notice: Subject to any disclaimer, the term of this patent is extended or adjusted under 35 U.S.C. 154(b) by 0 days.

(21) Appl. No.: 10/797,644

(22) Filed: Mar. 9, 2004

(65) Prior Publication Data

US 2005/0045350 A1      Mar. 3, 2005

Related U.S. Application Data

(60) Provisional application No. 60/499,091, filed on Aug. 28, 2003.

(51) Int. Cl.
*A01D 9/00* (2006.01)
(52) U.S. Cl. .................... 294/55.5; 294/49; 254/131.5; 209/417
(58) Field of Classification Search ............ 294/49, 294/55, 55.5, 59, 1.3, 1.4; 209/417, 418, 209/419; 56/400.04, 400.08, 400.09, 400.14; 254/131.5
See application file for complete search history.

(56) References Cited

U.S. PATENT DOCUMENTS

| | | | | | |
|---|---|---|---|---|---|
| 144,850 | A | * | 11/1873 | Kaestner | 209/419 |
| 226,351 | A | * | 4/1880 | Reddick | 209/419 |
| 4,461,458 | A | * | 7/1984 | Poulin | 254/131.5 |
| 4,730,860 | A | * | 3/1988 | Padgett | 294/49 |
| 5,417,044 | A | | 5/1995 | Russo | 56/400.11 |
| 6,022,058 | A | * | 2/2000 | O'Rourke | 294/1.3 |
| 6,416,097 | B1 | * | 7/2002 | O'Rourke | 294/55 |
| 6,474,267 | B1 | | 11/2002 | Padgett | 119/256 |
| 6,494,514 | B1 | * | 12/2002 | Stinnett et al. | 294/59 |

OTHER PUBLICATIONS

Woody_Pet.Com. (Professional Products for Winning Horses) "Why Do The Pro's Pick this Fork for Pick'n?", 2 pages, Aug. 29, 2003.
World_Pet_Store.Com. "Power Scoop Vibrating Litter Scoop", 1 page, May 17, 2004.

* cited by examiner

*Primary Examiner*—Dean J. Kramer
(74) *Attorney, Agent, or Firm*—Haverstock & Owens LLP

(57) ABSTRACT

A device is used to extract manure from bedding material in a manner that maximizes the amount of manure extracted from the bedding material. The device includes a detachable scoop head having a plurality of apertures, a detachable motor assembly coupled to the scoop head for vibrating the device, and a detachable handle coupled to the motor assembly via a connector. The handle can include a power pack for supplying electrical power to the motor assembly. The apertures are preferably formed between elongated elements. The power pack, which can be housed within the handle, forms a counterweight to the scoop head when the device is lifted. The device can further include a stand having a release mechanism coupled to the device, wherein the release mechanism releases the stand in a fully deployed position to facilitate raising the scoop head.

36 Claims, 3 Drawing Sheets

VIBRATING SCOOP BASKET

RELATED APPLICATION

This patent application claims priority under 35 U.S.C. 119 (e) of the co-pending U.S. Provisional Patent Application Ser. No. 60/499,091 filed Aug. 28, 2003, and entitled "VIBRATING SCOOP BASKET". The Provisional Patent Application, Ser. 60/499,091 filed Aug. 28, 2003, and entitled "VIBRATING SCOOP BASKET" is also hereby incorporated by reference.

FIELD OF THE INVENTION

The present invention relates to the field of excrement removal. More specifically, the present invention relates to the field of excrement removal utilizing a detachable hand-held device including a detachable motor assembly and detachable scoop head having a plurality of elongated elements.

BACKGROUND OF THE INVENTION

Typically horse stables utilize a bedding material such as saw chips, straw and other similar materials, to absorb the odor of manure and to make cleanup relatively simple. Originally, the process of removing the manure involved using a shovel-like device to scoop the manure plus any straw into a wheelbarrow. The contents of the wheelbarrow were then dumped into a landfill or used as fertilizer, which included both the manure and the straw. This method was inefficient for many reasons. The amount of wasted straw was high. With each scooped-load, a large amount of useful straw was discarded. Further, the mixture of straw and manure was not very valuable as fertilizer since manure, not straw, is what makes the fertilizer potent. Also, extra landfill area was needed to house wasted straw that should have been retained in the stall.

Improvements were made when the shovel-like device developed into a more rake-like device which could filter out the straw or bedding material from the manure. To utilize this type of device, a user would insert and raise the device containing the straw plus the manure, then manually shake the device so that the straw would fall through openings in the device. The user would then dump the remaining contents of the device which contained the manure and possibly a small amount of straw into a receptacle. The manual shaking of the rake-like device, however, is a strenuous process for the user as the load comprised of manure and bedding material can make the rake-like device difficult to scoop, raise and dump.

U.S. Pat. No. 5,417,044 to Russo entitled the "Horse Mucking Rake Device" also attempts to filter out the manure from the bedding material, by utilizing a rake-like device whereby a user manually shakes the device. The device, however, has tines separated apart from each other a distance large enough to pass both bedding material and manure between the tines.

U.S. Pat. No. 6,474,267 to Padgett entitled "Pelletized Animal Bedding and Process and Tool for Sifting Manure Therefrom", discloses a device and method of removing manure similar to the Russo patent described above. Padgett teaches a device that has a rake-like head with walls to prevent the manure from falling out, but with space between each tine a distance large enough to pass the bedding material but not manure through the tines. The head is attached to an elongated handle which is used to lift the head containing the manure and bedding material. By manually shaking the rake-like tool, the bedding material falls through the head and the remaining manure can be deposited in a wheelbarrow or receptacle. As mentioned before, the manual shaking of the device can be strenuous and can lead to short-term or long-term physical exhaustion, pain or disability. Further, this method of removing the bedding material is inefficient, since shaking the device manually does not always maximize the removal of bedding material between the tines.

Woody Pet Products, Inc. produces a machine called THE GREEN MACHINE™ which also sifts the usable bedding material from disposable manure. THE GREEN MACHINE™ teaches, however, that by using a large, expensive, and loud electrical vibrating machine, manure can be separated from bedding material. Before using the sifter, the horses typically must be removed from the stable since the loud noise from the machine can excite or frighten the horses. The large and heavy machine must be carted in and out of each stall for use. Once positioned for sifting, the user shovels the bedding including the manure onto the top of the machine. A motor is activated to cause vibrations which cause the usable bedding material to fall through to the ground. The separated manure is dumped into a receptacle. Although the machine can separate the manure from the bedding material, the drawbacks are apparent. The machine is very expensive and heavy, and the tasks of removing the horses from the stalls and moving the heavy machine from stall to stall, before and after use of the machine, can be time-consuming and arduous. Also, since the machine consumes much power, a battery pack is insufficient to power it. Typically a long power cord must be used to supply the power.

What is needed is an improved scoop device for extracting manure from bedding material and having detachable parts and a power pack housed within a detachable handle for forming a counterweight to a scoop head when the device is lifted.

SUMMARY OF THE INVENTION

A vibrating scoop basket is used to separate manure from bedding material. According to a first aspect of the present invention, a device for extracting manure from bedding material is disclosed. The device comprises a detachable scoop head having a plurality of apertures joined together to define a space. The apertures are sized to pass the bedding material there through but not the manure. The device also comprises a detachable motor assembly coupled to the scoop head via a connector for vibrating the device to promote the bedding material to fall through the apertures. The device further comprises a detachable handle coupled to the motor assembly, wherein the handle includes a power pack for supplying electrical power to the motor assembly and for forming a counterweight to the scoop head when the device is lifted. The apertures are preferably formed between elongated elements.

The power pack can be housed within the detachable handle. The power pack can include one or more batteries. The device can further include a switch disposed on the handle for connecting power from the power pack to the motor assembly via a plurality of wires. The motor assembly has a positive end and a negative end, and the wires can provide positive power from the power pack to the positive end of the motor assembly and negative power from the power pack to the negative end of the motor assembly. The motor assembly is a DC motor, and can be housed in a motor housing.

The device can further include a stand having two ends releasably coupled to the device by a release mechanism. A first end of the stand extends downward to a ground level at an approximately thirty degree angle from the device. A second end of the stand is secured to the device, preferably to a lower section of the device. The release mechanism releases the stand in a fully deployed position to facilitate raising the scoop head such that the first end of the stand comes into contact with the ground. In an alternative embodiment of the stand, the stand includes a substantially middle section coupled to the handle and two L-shaped arms that extend outward on either side of the device, wherein the device extends substantially perpendicular over the stand.

The scoop head includes a sloped bottom wall, two side walls, and a back wall. The side walls are coupled to the back wall at adjoining edges, and a section of the sloped bottom wall and a section of the side walls are coupled to a section of the elongated elements. The sloped bottom wall and the side walls have a plurality of open slots spaced apart from each other a distance to pass the bedding material between the open slots but not the manure. The elongated elements are angled between twenty and ninety degrees from the sloped bottom wall and point outward. The two side walls and the back wall are generally perpendicular to the bottom. The connector can be mounted on a middle section of the sloped bottom wall. The scoop head can be injected molded plastic. The scoop head can also be formed of elongated metal stock pot welded into position. The scoop head can also be formed of expanded metal sheet with sufficiently sized openings to pass bedding material but not manure. The expanded metal sheet is then folded to form a scoop.

According to another aspect of the present invention, a method of making a device to extract manure from bedding material is disclosed. The method comprises the steps of providing a detachable scoop head having a plurality of apertures joined together to define a space. The apertures are sized to pass the bedding material there through but not the manure. The method further comprises the step of providing a detachable motor assembly coupled to the scoop head via a connector for vibrating the device to promote the bedding material to fall through the apertures. The method also comprises the step of providing a detachable handle coupled to the motor assembly, wherein the handle includes a power pack for supplying electrical power to the motor assembly and for forming a counterweight to the scoop head when the device is lifted. The method can further include the step of providing a stand having two ends coupled to the device by a release mechanism, wherein the stand facilitates raising the scoop head.

DETAILED DESCRIPTION OF A PREFERRED EMBODIMENT

Reference will now be made in detail to the preferred and alternative embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it should be noted that the present invention may be practiced without these specific details. In other instances, well known methods, procedures and components have not been described in detail as not to unnecessarily obscure aspects of the present invention.

Figure 1:
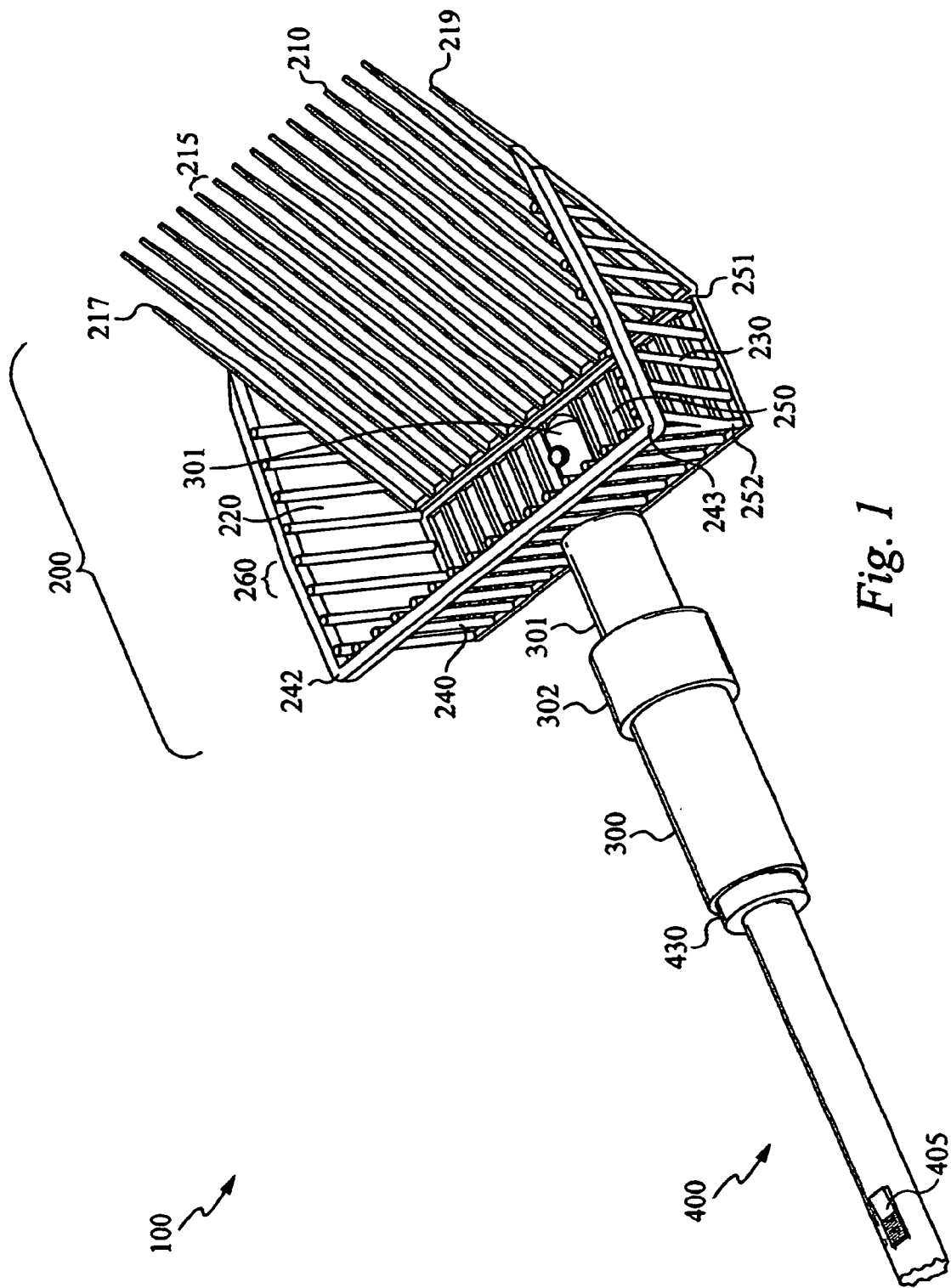
FIG. 1 illustrates a side view of a device for extracting manure from bedding material in accordance with an embodiment of the present invention.

Referring now to the drawings and particularly to FIG. 1, there is shown one embodiment of a device 100 for extracting manure from bedding material. The device 100 includes a detachable scoop head 200, a detachable motor assembly 300 coupled to the scoop head 200 via a connector 301, and a detachable handle 400 coupled to the motor assembly 300 via a coupling 350. The scoop head 200 comprises a plurality of apertures 215, a sloped bottom wall 250, first wall 220, a second side wall 230 and a back wall 240. The apertures 215 are sized to pass the bedding material but not the manure. The apertures 215 are formed between The elongated elements 210 can extend in multiple directions to maximize an amount of manure scooped and retained while still permitting most of the bedding material to fall through the apertures 215.

The elongated elements 210 are angled between twenty and ninety degrees from the bottom wall 250 and point outward. Outer sections 217 and 219 of the elongated elements 210 are coupled to both a section of the side walls 220 and 230 and a front section 251 of the bottom wall 250. The back wall 240 is perpendicular to the motor assembly 300, the side walls 220 and 230, and the bottom wall 250. The back wall 240 is coupled to the side walls 220 and 230 at adjoining edges 242 and 243, and is also coupled to a back section 252 of the bottom wall 250. Each of the walls 220, 230, 240 and 250 has a plurality of generally parallel slots 260 spaced apart from each other a distance to pass the bedding material between the parallel slots 260 but not the manure. The connector 301 extends into the scoop head 200 and is mounted on a middle section of the bottom wall 250.

The scoop head can be injected molded plastic. The scoop head can also be formed of elongated metal stock pot welded into position. The scoop head can also be formed of expanded metal sheet with sufficiently sized openings to pass bedding material but not manure. The expanded metal sheet is then folded to form a scoop.

The motor assembly 300, which is coupled to the scoop head 200 via the connector 301 and the handle 400, causes the connector 301 to vibrate the scoop head 200 to promote the bedding material to fall between the elongated elements 210 and the parallel slots 260. It will be appreciated that a horse barn can be a harsh environment for hand tools. The scoop head and the handle can be broken through use, being stepped on by a horse or user, or run over by a tractor. By making the components detachable, the ability to repair and replace components is enhanced. Not only can the motor assembly 300 be replaced, it can also be repaired since it is an external motor, accessible to a user. The motor assembly 300 can be a DC motor, and is housed in a motor housing 302. The motor assembly 300 has a positive end and a negative end.

Figure 2A:
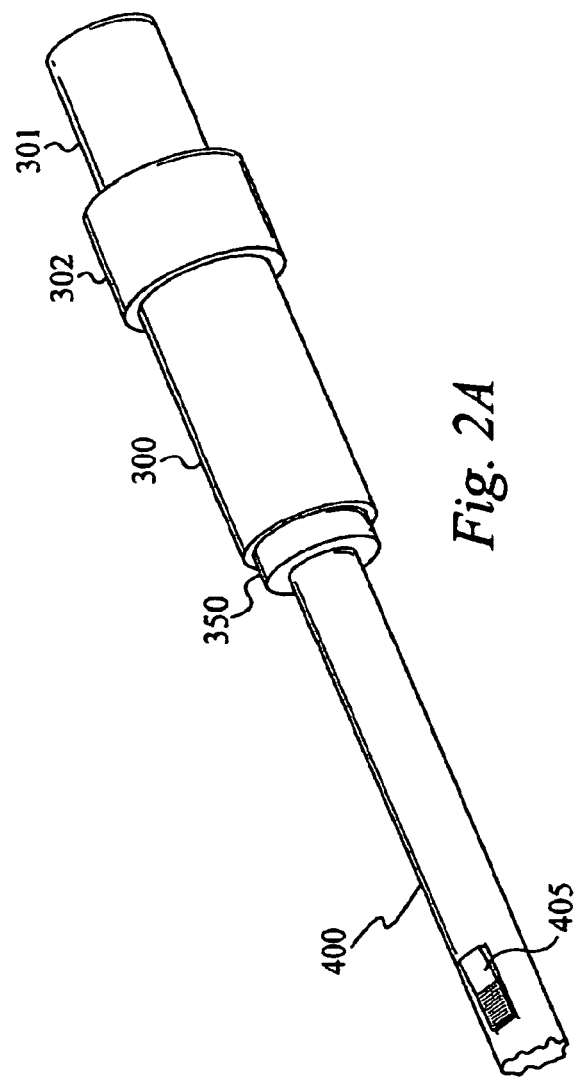
FIG. 2A illustrates a handle section of a device for extracting manure from bedding material with the scoop head removed, in accordance with the present invention.
Figure 2B:
FIG. 2B illustrates a side view of a power pack housed within the handle section of FIG. 2A, in accordance with the present invention.
Figure 2C:
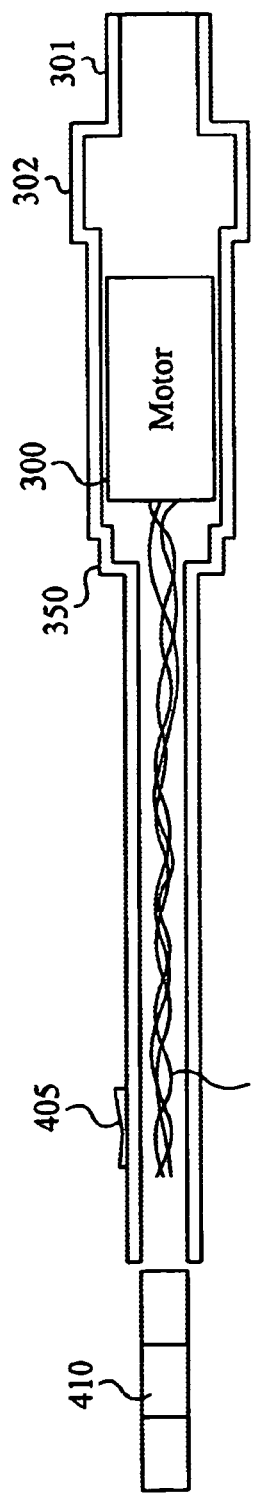
FIG. 2C illustrates a view of a battery pack handle, and motor coupled together, in accordance with the present invention.

Referring now to FIGS. 2A, 2B and 2C, the handle 400 includes a power pack 410 for supplying electrical power to the motor assembly 300. The power pack 410 also forms a counterweight to aid in lifting the device 100 (FIG. 1) when loaded. The power pack 410 can be housed within the handle 400 and includes one or more batteries. Preferably the batteries are rechargeable. The handle 400 further includes a switch 405 disposed on the handle 410 for connecting power from the power pack 410 to the motor assembly 300 via a plurality of wires 415. The wires 415 provide electric power from the power pack 410 to activate the motor assembly 300. To utilize the present invention, the user scoops up a portion of bedding material and manure and then activates the motor assembly 300 via the switch 405 causing the connector 301 to vibrate which causes the bedding material to fall through the scoop head 200 (FIG. 1), leaving only disposable manure (and used bedding material) in the scoop head 200 (FIG. 1). FIG. 2C illustrates the plurality of wires 415 connecting the battery pack to the motor.

Figure 3A:
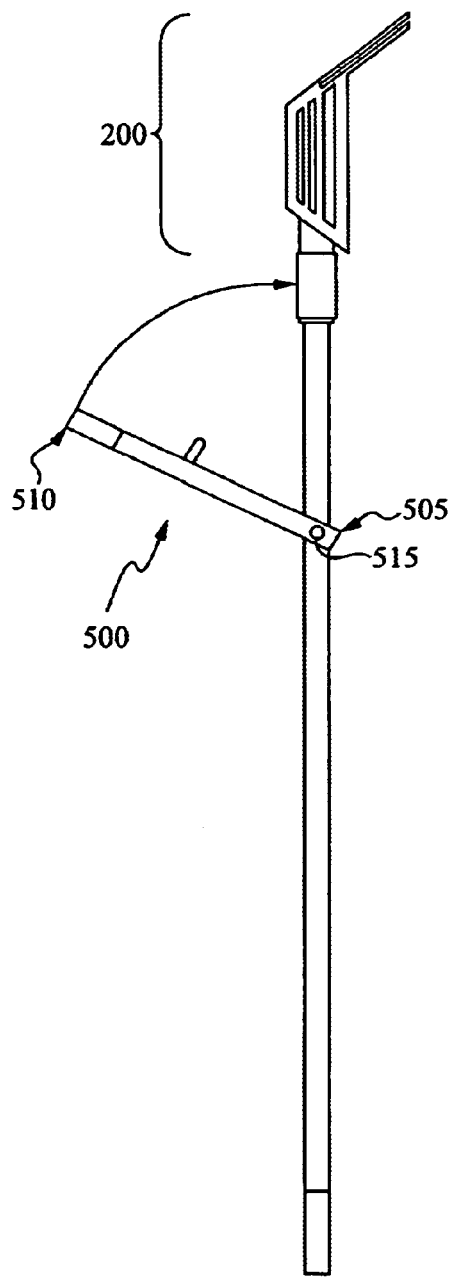
FIG. 3A illustrates an optional stand coupled to the device to facilitate raising the scoop head, in accordance with an alternative embodiment of the present invention.
Figure 3B:
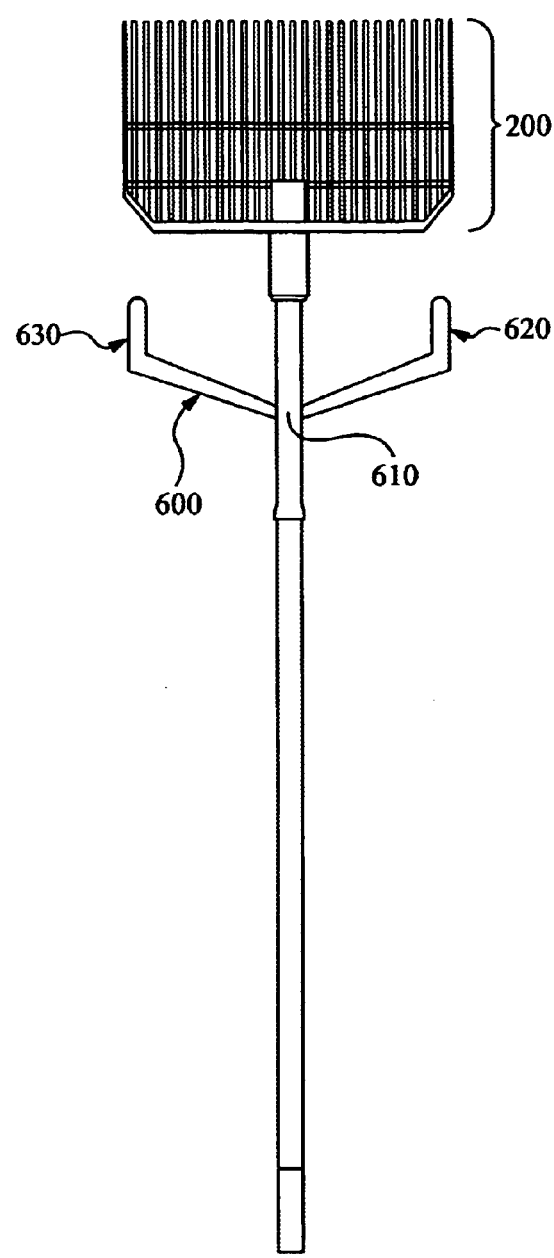
FIG. 3B illustrates another embodiment of an optional stand coupled to the device to facilitate raising the scoop, in accordance with an alternative embodiment of the present invention.

Referring now to FIGS. 3A and 3B, a stand 500 having two ends 505 and 510 is releasably coupled to the device by a release mechanism 515. A first end 510 of the stand 500 extends downward to a ground level at an approximately thirty degree angle from the device. A second end 505 of the stand 500 is secured to the device, preferably to a lower section of the handle. The release mechanism 515 releases the stand 500 in a fully deployed position to facilitate raising the scoop head such that the first end 510 of the stand 500 comes into contact with the ground level. By utilizing the stand 500, the user need only push down on a proximal section of the handle 400 to raise the scoop head 200 (FIG. 1) full of manure and bedding material. In an alternative embodiment of a optional stand 600, as shown in FIG. 3B, the optional stand 600 includes a substantially middle section 610 coupled to the handle and two L-shaped arms 620 and 630 that extend outward on either side of the device, wherein the device extends substantially perpendicular over the stand 600. This embodiment can reduce the number of back problems resulting from manure cleanup since use of the stands will minimize strain on the user.

The floors in many horse barns are uneven. The wheels are preferably caster mounted and larger than the typical surface irregularities in a barn floor to allow ease of moving the assembly from one stall to the next.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made to the embodiments chosen for illustration without departing from the spirit and scope of the invention.

What is claimed is:

1. A device for extracting manure from bedding material, comprising:
   a. a detachable scoop head having a plurality of apertures joined together to define a space, the apertures sized to pass the bedding material there through but not the manure;
   b. a detachable motor assembly coupled to the scoop head via a connector for vibrating the device to promote the bedding material to fall through the apertures;
   c. a detachable handle coupled to the motor assembly via a coupling, wherein the handle includes a power pack for supplying electrical power to the motor assembly and for forming a counterweight to the scoop head when the device is lifted; and
   d. a stand having a release mechanism coupled to the device, wherein the release mechanism releases the stand in a fully deployed position to facilitate raising the scoop head.

2. The device of claim 1, wherein the apertures are formed between elongated elements.

3. The device of claim 2, wherein the scoop head includes a sloped bottom wall, two side walls, and a back wall, the side walls being coupled to the back wall at adjoining edges, a section of the sloped bottom wall and a section of the side walls being coupled to a section of the elongated elements, and wherein each of the walls has a plurality of generally parallel slots spaced apart from each other a distance to pass the bedding material between the parallel slots but not the manure.

4. The device of claim 3, wherein the side walls and the back wall are generally perpendicular to the bottom wall.

5. The device of claim 3, wherein the elongated elements are angled between twenty and ninety degrees from the sloped bottom wall and point outward.

6. The device of claim 3, wherein the connector is mounted on a middle section of the sloped bottom wall.

7. The device of claim 1, wherein the power pack is housed within the detachable handle.

8. The device of claim 1, wherein the power pack includes one or more batteries.

9. The device of claim 1, further including a switch disposed on the handle for connecting power from the power pack to the motor assembly via a plurality of wires.

10. The device of claim 9, wherein the motor assembly has a positive end and a negative end, the wires providing positive power from the power pack to the positive end of the motor assembly and negative power from the power pack to the negative end of the motor assembly.

11. The device of claim 1, wherein the motor assembly is a DC motor.

12. The device of claim 1, wherein the motor assembly is housed in a motor housing.

13. The device of claim 1, wherein a first end of the stand extends downward to a ground level at an approximately thirty degree angle from the device in the fully deployed position and a second end of the stand is secured to the device.

14. The device of claim 1, wherein the stand is coupled to the device substantially near a middle section and comprises two L-shaped arms that extend outwardly on either side of the device in the fully deployed position, wherein the device extends substantially perpendicular over the stand.

15. The device of claim 1, wherein the scoop head is injected molded plastic.

16. The device of claim 1, wherein the scoop head is formed of elongated metal stock pot welded into position.

17. The device of claim 1, wherein the scoop head is formed of expanded metal sheet with sufficiently sized openings to pass the bedding material but not the manure.

18. The device of claim 17, wherein the expanded metal sheet is folded to form a scoop.

19. A method of making a device to extract manure from bedding material, comprising the steps:
 a. providing a detachable scoop head having a plurality of apertures joined together to define a space, the apertures sized to pass the bedding material there through but not the manure;
 b. providing a detachable motor assembly coupled to the scoop head via a connector for vibrating the device to promote the bedding material to fall through the apertures;
 c. providing a detachable handle coupled to the motor assembly via a coupling, wherein the handle includes a power pack for supplying electrical power to the motor assembly and for forming a counterweight to the scoop head when the device is lifted; and
 d. providing a stand having a release mechanism coupled to the device, wherein the release mechanism releases the stand in a fully deployed position to facilitate raising the scoop head.

20. The method of claim 19, wherein the apertures are formed between elongated elements.

21. The method of claim 20, wherein the scoop head includes a sloped bottom wall, two side walls, and a back wall, the side walls being coupled to the back wall at adjoining edges, a section of the sloped bottom wall and a section of the side walls being coupled to a section of the elongated elements, and wherein each of the walls has a plurality of generally parallel slots spaced apart from each other a distance to pass the bedding material between the parallel slots but not the manure.

22. The method of claim 21, wherein the side walls and the back wall are generally perpendicular to the sloped bottom wall.

23. The method of claim 21, wherein the elongated elements are angled between twenty and ninety degrees from the sloped bottom wall and point outward.

24. The method of claim 21, wherein the connector is mounted on a middle section of the sloped bottom wall.

25. The method of claim 19, wherein the power pack is housed within the detachable handle.

26. The method of claim 19, wherein the power pack includes one or more batteries.

27. The method of claim 19, further including a switch disposed on the handle for connecting power from the power pack to the motor assembly via a plurality of wires.

28. The method of claim 27, wherein the motor assembly has a positive end and a negative end, the wires providing positive power from the power pack to the positive end of the motor assembly and negative power from the power pack to the negative end of the motor assembly.

29. The method of claim 19, wherein the motor assembly is a DC motor.

30. The method of claim 19, wherein the motor assembly is housed in a motor housing.

31. The method of claim 19, wherein a first end of the stand extends downward to a ground level at an approximately thirty degree angle from the device in the fully deployed position and a second end of the stand is secured to the device.

32. The method of claim 19, wherein the stand is coupled to the device substantially near a middle section and comprises two L-shaped arms that extend outwardly on either side of the device in the fully deployed position, wherein the device extends substantially perpendicular over the stand.

33. The method of claim 19, wherein the scoop head is injected molded plastic.

34. The method of claim 19, wherein the scoop head is formed of elongated metal stock pot welded into position.

35. The method of claim 19, wherein the scoop head is formed of expanded metal sheet with sufficiently sized openings to pass the bedding material but not the manure.

36. The method of claim 35, wherein the expanded metal sheet is folded to form a scoop.

* * * * *

UNITED STATES PATENT AND TRADEMARK OFFICE
CERTIFICATE OF CORRECTION

| | | |
|---|---|---|
| PATENT NO. | : 7,044,520 B2 | Page 1 of 1 |
| APPLICATION NO. | : 10/797644 | |
| DATED | : May 16, 2006 | |
| INVENTOR(S) | : Glenn A. Roberson, Jr., Glenn A. Roberson, III and Paul Domato | |

It is certified that error appears in the above-identified patent and that said Letters Patent is hereby corrected as shown below:

column 5, lines 58-61, remove –The floors in many horse barns are uneven. The wheels are preferably caster mounted and larger than the typical surface irregularities in a barn floor to allow ease of moving the assembly from one stall to the next.–

Signed and Sealed this

Twenty-second Day of August, 2006

JON W. DUDAS
*Director of the United States Patent and Trademark Office*